Patented June 7, 1938

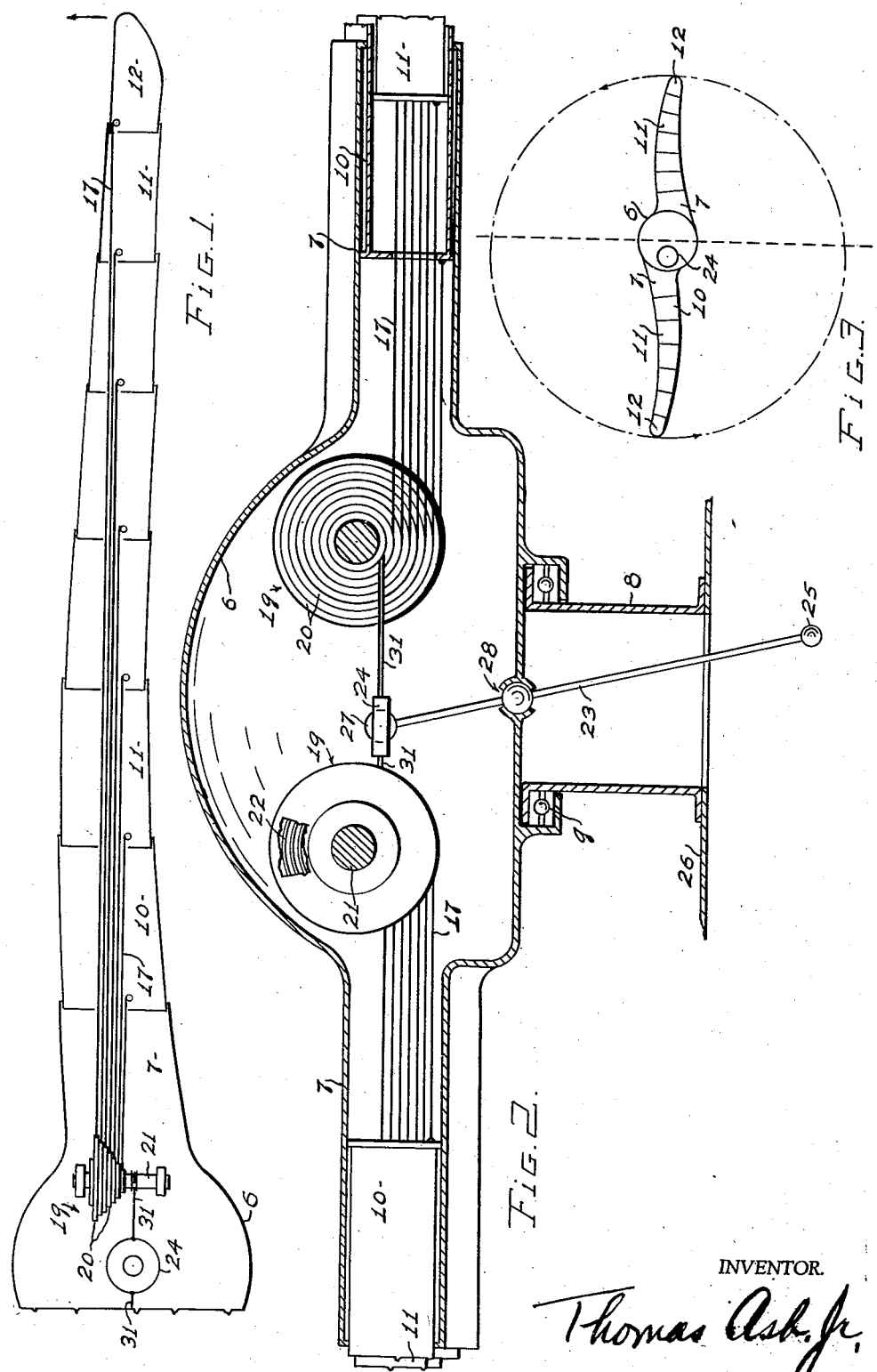

2,120,168

UNITED STATES PATENT OFFICE 2,120,168

AERODYNAMIC ROTOR

Thomas Ash, Jr., Los Angeles, Calif.

Application January 19, 1937, Serial No. 121,333

11 Claims. (Cl. 244—18)

My invention relates to aerodynamic rotors or rotary airfoil systems used for lift and/or propulsion of aircraft. Rotors of this type are either power driven or rotated as a result of certain reactions of air currents, to produce lift, and are power driven for propulsion.

One object of the present invention is to provide a rotor or rotary wing system which can be expanded and contracted as required; as distinguished from rotors in which the span is changed, for example, by moving the sections successively. By the terms "expand" and "contract" as used herein, co-ordinate movement of all sections is implied. By my invention the act of "contracting" a wing from full span to one-half span, for example, consists in retracting each and every section one-half way into the next section's interior so that each and every one of the sections is one-half exposed and operative.

Another object of the invention is to provide for changing the lift of each wing, either for a prolonged period or only during a part of each revolution, without resorting to change of pitch; whereby each and every section may be selected for its highest efficiency at usual angle of incidence. It will be understood in the consideration of this invention that to change the lift of a wing by changing its span is more efficient than to do so by increasing the angle of attack, since ideal air-foil sections such as I am enabled to use, show their highest L/D at only a given angle.

Another object of the invention, particularly with regard to the usual lifting rotor or rotating wing system, is to provide balance to the rotor by compensating for the usual difference in lift between the advancing wing and the retreating wing. I am aware that this has been done by pitch changing means, or by periodically operated ailerons, or by still other means, but the objection to all such means is that they then act to increase drag. I herein show a method whereby the lift of any wing at any time may be changed without decreasing the L/D.

Another object of the invention is safety in starting as well as in landing and in this connection I provide a rotor which will expand only as the rotative speed increases to a degree sufficient to hold the blades or wings properly supported. Very great lifting surface is another object of this invention to provide for vertical take-off; after which the rotor will act to reduce its span to some intermediate dimension suitable for sustension in flight. It is also an object of the invention to provide a rotor which will not stall by reason of contracting whenever speed is reduced.

Inherent rigidity and resistance to torsion, all without depending upon centrifugal force to provide the required rigidity, are other objects of this invention.

In carrying out my invention I provide for: change in total lift as for climbing or to meet changes in load or wind conditions; periodic change of lift of each wing once in every revolution for balance; and directional change of lift of the swept-disc area for turning; all by the act of varying the wing length as and when required and by sensitive or properly responsive means either manually controlled or automatic. In this connection it is an object of the invention that in increasing the lift on one side of the disc area while decreasing the lift on the other side, I shall maintain the same total swept-disc area and the same lift; whereas other rotors have the objectionable feature of reducing the area, and the lift as a whole, whenever the lift of a wing is changed temporarily.

Other objects of the invention include, simplicity of control; adaptability of the invention to an article of manufacture for mass production; and the provision of a manufactured rotor which has a variety of applications as will appear hereinafter.

Illustrative of my invention I have shown by the accompanying drawing, one practical embodiment of my invention, useful as a rotary wing system, and useful as a propeller, and useful for other purposes hereinafter set forth, and particularly useful as a wing system for aircraft by reason of being capable of carrying out all of the aforesaid objects.

In the drawing:—

Figure 1 is a diagram showing the arrangement of the parts of a wing forming a part of the complete rotor.

Figure 2 is a vertical sectional view of the rotor.

Figure 3 is a diagram showing the rotor in operation and in position to effect a turn.

The reference numeral 6 indicates a rotary head or hub from which project a plurality of radially arranged wing stubs, 7, 7, two or more in number and preferably integral with the hub. The hub is rotatably carried by the pylon or stator 8 thru the medium of a bearing 9.

A complete wing which I will now describe comprises the hub extension or stub wing 7 and a plurality of telescoping airfoil sections 10, 11, 12, etc. Section 10, nearest the stub 7 and adapted to telescope directly into the stub, is known as the innermost section. Section 12 forms the tip section and is outermost, while the numeral 11 indicates the plurality of intermediate airfoil sections.

These sections, in keeping with objects of the invention and for maximum efficiency, are of successively decreasing chord, thickness and angle of attack, respectively outwardly from section 10 to section 12. This arrangement allows each section to be selected in view of its relative peripheral speed and provides a wing or blade of helical character capable of sustaining a craft and capable at proper span and speed to act as a propeller, helicopter, or screw. Each section is very slightly arcuate or forwardly bowed so that in any extended position the wing or blade takes on a sabre shape and has its line of center of lift disposed partially ahead of, and partially to the rear of a radial line representing the line along which centrifugal force is directed. This shape of wing reduces torsion or twist as well as having obvious aerodynamic advantages in a rotating wing. Of course any usual means may be incorporated for changing the pitch or angle of attack of a wing or blade as a whole; such means being now well known to this art. This invention is however directed to means for changing lift by change of span so that each and every air-foil may operate under the usual and ideal angle of attack for which it was initially selected, so that high efficiency is provided just at the time when greatest lift is required, as in vertical take-off or under heavy load in flight.

A salient feature of the invention provides individual cables 17, 17, etc.; one for each individual section so that each section is securely held in place, and all cables extend into the hub so that they may be pulled in to contract the wing, or may be played out to expand the wing. While the cables are always moved simultaneously, it is a peculiarity of this wing that the independent rate of movement of each cable is always proportional to its length. Thus with the seven sections shown the outermost sections cable is always moved at seven times the lineal speed of the cable of the innermost section. This provides that at all positions of the wing equal parts of each and every section are exposed to create their share of lift.

To so move the cables there is provided a conical-surfaced reel 19 having a plurality of correspondingly graduated winding surfaces 20; one such surface for each cable and to which the corresponding cable is attached or convoluted. Thus by turning the reel upon its shaft 21, all cables may be wound in simultaneously but each at a rate proportional to the distance it must travel for the corresponding section to become disposed in fully contracted position within the wing stub.

This reel may be actuated in any well known manner such as by means which even during flight will wind the cables in and hold them locked against centrifugal force in any predetermined or desired span. Such means are now well known to the art. To carry out certain new objects and advantages the reel is of the well known spring-actuated type and includes heavy coiled springs such as 22 forming the connection between the shaft 21 and the winding-faced portion. This arrangement allows the centrifugal effect on the wing sections to determine the degree to which a given degree of rotation of shaft 21 will move the cables 17. Also it provides safety by automatically contracting the wing when the rotative speed is dangerously low, and by allowing the wing to expand under centrifugal action only when the rotative speed is high enough to hold the wings safely supported.

To rotate each shaft 21 as required against the opposite urge set up by centrifugal forces I provide control means about to be described. Said means includes a control stick 23 having one end within the hub provided with an eccentric ring 24. While this ring is circular or of any other suitable shape, it is termed an eccentric since it is almost invariably held off-center within the hub. The control stick has its other end 25 extended down thru the pylon so that it can be reached from a point such as within the cabin of an aircraft 26 to which my invention is applied. To provide for controlled universal movement of the ring 24, the corresponding end of the stick is formed with a ball 27 on which the ring 24 is supported to rotate freely. An intermediate part of the stick is provided with a ball-and-socket bearing supported by the hub. It will be seen now that in any adjusted position of the control stick 23 the hub or rotor will rotate without changing the position of the stick and the ring 24 is free to revolve with the hub. Cables 31, 31, project radially from the ring 24 and are each wound around the corresponding reel-shaft to turn these shafts slightly during a part of each revolution to thereby provide for constantly changing the lift according to a feature of this invention.

The operation of the parts described may be well explained by first explaining how the rotor would be used on an aircraft of the type in which a rotor forms the wings or lifting surface. By usual means the power plant of the craft is connected with the rotor to drive the hub and wings at a high rotative speed in preparation for a vertical take-off. When a certain speed is reached centrifugal force of the airfoil sections will overcome the tension of the springs in the reel and the sections will move outwardly under the urge of centrifugal force. The tip section will move faster than any other section due to the large diameter of the groove on which its cable 17 is wound; the other sections moving at correspondingly reduced rates so that the wing or blade as a whole will "expand". When so expanded to full span the high rotative speed together with the helicopter action of the rotor blades will lift the craft from the ground in a practically vertical takeoff until such time as power can be connected with the propeller of the craft. From then on the rotor will continue to rotate by the well known action as the craft moves thru the air. This automatic rotation is not as rapid as during takeoff when the rotor was power driven and the result is that the decreased centrifugal force will allow the springs of the reels to wind in the cables 17 until their span is such that tension of the springs just balances centrifugal force. Then under usual flying conditions the span of the wings will be no greater than that required to keep the craft afloat and such craft is not hampered by having to at all times carry the span required at takeoff.

The ring 24, between the centrifugal forces of the two opposed wings or blades will tend to centralize in the hub and will revolve therewith concentrically with both blades having equal span. As is well understood however, this equal span will give rise to vibration and unequal lift since while one blade is moving ahead the other blade is retreating and the difference in relative "air-speed" of the blades becomes objectionable. It is the purpose of the ring 24 and the "control-stick" to overcome this unbalance. Accordingly the "stick" is moved to shift the ring 24 so it is moved off-center along a line normal to the path of movement of the craft. This offset position is shown in Figure 2. Now, as each wing comes around to the right-hand half of the swept-disc area (with the rotor moving anti-clock-wise and with the craft moving in the same general direction as the right-hand wing tip) the reel of the right-hand wing is moving away from the ring 24 with the result that cable 31 on the corresponding reel is then unwound slightly causing the cables 17, and particularly the cable 17 of the tip section, to move inward an appreciable distance, to appreciably "contract" the wing then passing thru the right hand half of the swept-disc. At the same time the other reel is moving toward the ring 24 which reduces the tension of the spring in the reel and allows centrifugal force to slightly "expand" the wing then passing thru the left-hand half of the swept-disc. Thus, while the total span of two opposed wings remains the same one wing actually expands and the other contracts in conformity with existing air-speeds and with the result that lift is equally balanced. For any given flying speed and wind condition there is an eccentric position for the ring 24 which will give just the correct balance of lift between opposite sides of the area swept by the blades or wings, and this correct position of the ring 24 may at all times be controlled by the operator, or automatically by suitable means (not shown).

The diameters of the respective grooves in which the various cables are disposed may be so proportioned, for example, that by shifting the ring 24 as little as two inches one wing will expand a distance of one foot and the other contract a distance of one foot. This difference, or eccentricity of the swept-disc-area with respect to the center of the hub, or this decentralization of the disc with respect to the suspended craft, may be quite sufficient even where the total span is as great as forty feet.

It will be observed that a difference in lift between the opposite sides of the swept-disc-area creates not only a difference corresponding to change in length of the wings, but also a difference in lift by reason of the fact that the shortened or contracted wing has a reduced peripheral speed while the expanded wing undergoes increased peripheral speed.

Further shifting of the ring 24 will produce a decidedly unbalanced condition, and such "unbalance" is employed by my new rotor to maneuver the ship. When the ring is shifted well to the rear preponderance of lift is placed at the rear of the swept-disc and the craft noses downwardly. Shifted to the front the preponderance of lift will cause the craft to nose up or climb. Shifted to the east the ring will act to lengthen the wing then passing thru the east half of the disc-area and to decrease the span of the wing then passing thru the west half with the result that the rotor will tilt accordingly and the craft will veer to the west. Thus by shifting the "control stick" beyond the position then required for correct balance the craft may be controlled in all usual maneuvers and my improved rotor thereby provides both lifting and control means such that its attachment to any suitable under carriage will produce a complete aircraft. At all times a given rotative speed of the rotor will indicate the span of the wings but this span may be changed by changing the tension of the spring-actuated reels by winding the cables 31 on the ring 24 accordingly by any such means as are now well known in this art.

Using the rotor illustrated and described, in this or any other suitable embodiment, as a propeller is purely a matter of proper proportioning of the parts, altho means for shifting the ring 24 is not required in the ordinary propeller. As a propeller, as a fan, or as any other aerodynamic device, it has the advantage of changing span with changing speed, and either as a propeller or as a rotary wing system the wings or blades are automatically contracted whenever centrifugal speed is dangerously reduced. Of course any usual pitch-changing means may be incorporated in this rotor without exercise of invention but the advantages of this invention would thereby become more pronounced since an inadvertent change of pitch such as would stall any other rotor would not be disastrous to my rotor since immediately it was retarded it would automatically contract sufficiently to suitably reduce the resistance imposed by the increased angle of attack, and this applies alike to propellers and rotary wings.

There are still other aerodynamic applications for a rotor of this type where propulsion or propulsion and lift combined, are desired. For example: it is known that certain types of airfoil sections moved into the wind, even at an appreciable angle thereto, will produce a forward urge due to certain re-actions of the natural air currents against the oppositely moving airfoil. However, as this same airfoil section passes over to the other side of the swept-disc area it begins to move with the wind and the previous forward urge is largely offset. Now I propose to take advantage of this phenomenon with my new rotor by expanding each wing or blade to the maximum as it moves into the wind, and by then contracting each wing or blade to minimum length as it turns and moves with the wind.

This application is a continuation in part of my previous applications to wit:—

It will be apparent now that I have provided for carrying out the objects of the invention and while I have been specific in illustrating and describing a certain form of my invention such is only by way of example and does not limit the scope of my invention and I may employ other constructions and arrangements of parts within the scope of the appended claims, without departing from the spirit of this invention.

I claim:

1. In a telescopic wing of the class described comprising a plurality of telescoping airfoil sections, a reel at one end of the wing provided with a plurality of graduated winding surfaces, and cables, one for each section attached at one end to the corresponding section and at the other end to the corresponding winding surface of the reel.

2. The wing as in claim 1 and in which said reel is of the spring actuated type and adjusted to hold the wing at a given span for each given rotative speed.

3. The wing as in claim 1 and in which said reel is of the spring actuated type; the wing including means for changing the spring tension of the reel.

4. The wing as in claim 1 and in which said reel is of the spring actuated type; the wing including means for changing the spring tension of the reel during a portion of each revolution of the wing about its axis of rotation.

5. In a rotor of the class described, the combination, of a hub, a telescopic wing projecting from said hub and comprising a plurality of telescopically associated airfoil sections each of decreasing chord, thickness and angle of attack respectively outwardly, a multisurfaced winding reel in said hub, cables, one for and attached to each section and extending thru the wing and into the hub and there connected to the reel each so as to be wound on a corresponding surface of said reel.

6. The rotor as in claim 5 and including means operable during a part only of each revolution of the rotor to slightly operate said winding reel.

7. The rotor as in claim 5 and including means operable during a part only of each revolution of the rotor to operate said winding reel any preselected degree at the will of an operator.

8. The rotor as in claim 5 and further including a shaft upon which said reel rotates and a spring connecting said shaft with said reel.

9. The rotor as in claim 5 and further including a shaft upon which said reel rotates, a spring connecting said shaft with said reel, and means for temporarily increasing and then decreasing the tension of said spring once during each revolution of the rotor.

10. In a rotary lifting system of the class described the combination of a hub, a plurality of contractile wings radiating from said hub, and eccentric means within the hub operating to contract each blade as it moves thru any predetermined portion of a complete revolution of the rotor and to permit the blade to again expand as it moves thru an opposite portion of a complete revolution of the rotor.

11. The wing as in claim 1 in which the wing is forwardly bowed; certain of said cables connected near the front edge of the corresponding section and other of the cables connected near the rear edge of the corresponding section whereby the wing will retain its bowed shape under centrifugal action.

THOMAS ASH, Jr.